United States Patent
Fiedler et al.

(10) Patent No.: US 10,812,561 B2
(45) Date of Patent: Oct. 20, 2020

(54) METHOD FOR PRESERVING MEDIA PLANE QUALITY

(71) Applicant: Telefonaktiebolaget LM Ericsson (publ), Stockholm (SE)

(72) Inventors: Dietmar Fiedler, Kirkkonummi (FI); Tuomas Erke, Espoo (FI); David Sjöstrand, Mariehamn (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 135 days.

(21) Appl. No.: 15/577,094

(22) PCT Filed: Jun. 24, 2015

(86) PCT No.: PCT/EP2015/064238
§ 371 (c)(1),
(2) Date: Nov. 27, 2017

(87) PCT Pub. No.: WO2016/206735
PCT Pub. Date: Dec. 29, 2016

(65) Prior Publication Data
US 2018/0183851 A1  Jun. 28, 2018

(51) Int. Cl.
G06F 15/16 (2006.01)
H04L 29/06 (2006.01)
H04L 29/08 (2006.01)

(52) U.S. Cl.
CPC .......... H04L 65/80 (2013.01); H04L 65/605 (2013.01); H04L 67/1031 (2013.01)

(58) Field of Classification Search
CPC .... H04L 65/80; H04L 65/605; H04L 67/1031
See application file for complete search history.

(56) References Cited

U.S. PATENT DOCUMENTS 9,760,428 B1 * 9/2017 Felstaine ............... H04L 41/022
9,912,558 B2 * 3/2018 Chou ..................... H04L 43/08
(Continued)

FOREIGN PATENT DOCUMENTS

WO  2015020573 A1  2/2015
WO  2015072898 A1  5/2015

OTHER PUBLICATIONS

European Telecommunications Standards Institute, "Network Functions Virtualisation (NFV); Service Quality Metrics", ETSI GS NFV-INF 010 V1.1.1, Dec. 2014, pp. 1-27.
(Continued)

Primary Examiner — John B Walsh
(74) Attorney, Agent, or Firm — Coats & Bennett, PLLC

(57) ABSTRACT

A system, method, node, virtualized network function, and computer program for preserving a media stream quality at processing of a media stream by a virtualized network function for media handling (210) is presented. The virtualized network function for media handling (210) is running in a network function virtualization infrastructure (130) hosting the virtualized network function for media handling (210). The virtualized network function for media handling (210) is managed by a virtualized network function manager (220). The method comprises to determine a media stream quality caused by the processing of the media stream by the virtualized network function for media handling (210). The method further comprises that the virtualized network function manager (220) scales the virtualized network function for media handling (210) as a result of the determining step.

13 Claims, 6 Drawing Sheets

(56) References Cited

U.S. PATENT DOCUMENTS

2015/0222515 A1* 8/2015 Mimura ............ H04L 43/0876
 709/224
2016/0335111 A1* 11/2016 Bruun ................ G06F 9/45558
2017/0017512 A1* 1/2017 Csatari ................ G06F 9/4856

OTHER PUBLICATIONS

European Telecommunications Standards Institute, "Network Functions Virtualisation (NFV); Architectural Framework", ETSI GS NFV 002 V1.2.1, Dec. 2014, pp. 1-21.

* cited by examiner

VNF for media handling, function

VNF Manager, scaling out

VNF Manager, scaling in

VNF for media handling, apparatus

VNF Manager, apparatus

METHOD FOR PRESERVING MEDIA PLANE QUALITY

TECHNICAL FIELD

The present invention relates to telecommunications and in particular to a system, method, node, virtualized network function, and computer program for preserving a media stream quality at processing of a media stream by a virtualized network function for media handling.

BACKGROUND

A good speech quality is a key characteristic of a communication network and is therefore always in focus of network operators and users. The encoding and decoding of speech audio is today well understood and the available processing power in the user equipment and within the communication network allows to use even complex codecs which allows to produce high definition speech coded media streams. Also the aspects of loss of speech frames due to radio coverage problems and packet transport network congestion are well understood and there are solutions to counteract these sources of speech quality impairment.

However, there are more aspects influencing the perceived speech quality within a conversation, and delay and jitter are essential for this aspect. G.114, "One-Way Transmission Time" is an ITU-T recommendation that addresses acceptable delays for voice applications and one of the aspects it addresses is voice delay.

This ITU recommendation defines that a voice delay of less than 150 milliseconds is acceptable and a voice delay of more than 400 milliseconds is unacceptable. In-between these two delay values there is a noticeable, but still tolerable, speech quality impairment. The issue of voice delay can be experienced in oversea telephone calls, where the sheer distance can cause a noticeable delay disturbing a lively discussion over the phone. So voice delay is a critical factor influencing speech quality. Similar reasoning is valid for real-time video calls.

An ongoing trend in the telecommunication industry is to "move network functions into the cloud", meaning that instead of using dedicated and specialized (but expensive) processing hardware, to run the corresponding network functions in generic data centers comprising bulks of general purpose (but cheap) processing hardware. These data centers may even be owned and operated by a different company and the processing power would be rented dynamically, depending on the need and the price.

So the resources may be rented from different data center providers over time. In this scenario the network operator has no influence on what the processing hardware would be and what operating system would be used to host the network functions. There may even be changes of processing hardware and operating system while the network functions are running.

The ETSI standardization forum has recognized this trend to virtualize network functions and is standardizing an architectural framework for network function virtualization (NFV), see ETSI GS NFV002 V1.2.1, and FIG. 1. Network Functions Virtualization envisages the implementation of network functions as software-only entities that run on the NFV Infrastructure (NFVI) 130. As such, four main domains are identified in FIG. 1:

Virtualized Network Functions (VNF) 100, as the software implementation of a network function which is capable of running on the NFVI.

NFV Infrastructure (NFVI) 130, including the diversity of physical resources and how these can be virtualized. NFVI supports the execution of the VNFs.

NFV Management 120, which covers the orchestration and management of physical and/or software resources (via a NFVI Manager 190), that support the infrastructure virtualization, and the lifecycle management of VNFs. NFV Management focuses on all virtualization-specific management tasks necessary in the NFV framework.

NFVI Manager 190, which covers the orchestration, management, and lifecycle management of physical and/or software resources that support the infrastructure virtualization.

The NFV framework enables dynamic instantiation and management of VNF instances and the relationships between them regarding data, control, management, dependencies and other attributes.

Traditionally, media handling has been done in specialized nodes, the media handling nodes or also called media plane nodes. Today's communication networks are built up with split architecture (distributed architecture). Split architecture means that the controlling node can be separated node from the media plane node.

That solution is standardized for softswitch networks as well as for IP Multimedia Subsystem, IMS, networks. For example, in IMS networks a Session Border Controller (SBC) is the controlling node and Border Gateway function is the media plane node, in a softswitch network the controlling node is the Mobile Switching Centre, MSC, and the media plane node is a Media Gateway, MGW.

In today's solutions the media plane nodes are implemented on top of specialized hardware. That was especially needed, because voice or video processing is a very heavy and time critical task. On top of the specialized hardware there is a real-time operating system, which allows highly utilization of the specialized hardware and still achieving a graceful behavior at overload situations.

Such overload is then reported to the responsible controlling node, which can take appropriate actions to mitigate the overload, such as back pressure to the source of the traffic (e.g. rejection of new calls) or load re-distribution (select a different media plane node for further traffic). This highly dedicated implementation of the media plane node allowed achieving neglectable and stable processing times of media frames at processing of the media frames within the media plane node.

As mentioned above, when moving network functions into the cloud, neither the hardware platform, nor the operating system can be influenced anymore. This is critical in particular for the function of media handling nodes, as the cloud platform (hardware plus operating system) is not real-time capable anymore.

As a consequence, the processing times of media frames may increase or vary drastically. In addition to the impact on voice delay as required by the ITU G.114, a single delayed packet may arrive too late at the receiving end (beyond the clock cycle given by the used codec) and would be dropped there. This causes additional speech quality deterioration.

The delay and the delay variance (=jitter) is also a function of the utilization of the function of media handling node. A higher utilization increases the delay and also increases the delay variance. However, the utilization is a function of the available platform resources, which is unknown or may even change over time.

So this has consequences on the utilization headroom of virtualized network function (VNF) for media handling. It is not clear at deployment of a VNF for media handling how much these VNF for media handling can be loaded with traffic. If the NFVI is changed or tuned while a hosted VNF for media handling is running, this load headroom may even vary over time.

A solution is needed to overcome these uncertainties of delay, delay variance, and utilization headroom when applying media handling as a virtual network function and preserve the quality of the speech or video stream.

SUMMARY

There is a clear need for preserving a media stream quality at processing of a media stream in a media handling node, wherein the media handling node is running as a virtualized network function in a network function virtualization infrastructure hosting the virtualized network function. This object is achieved by the independent claims. Advantageous embodiments are described in the dependent claims.

According to an exemplary aspect of the invention, a method for preserving a media stream quality at processing of a media stream by a virtualized network function for media handling is provided. The virtualized network function for media handling is running in a network function virtualization infrastructure hosting the virtualized network function for media handling, and the virtualized network function for media handling is managed by a virtualized network function manager. The method comprises to determine a media stream quality caused by the processing of the media stream by the virtualized network function for media handling, and that the virtualized network function manager as a result of the determining step, scales the virtualized network function for media handling.

According to another exemplary aspect of the invention, a method in a virtualized network function for media handling for preserving a media stream quality at processing of a media stream by the virtualized network function for media handling is provided. The virtualized network function for media handling is running in a network function virtualization infrastructure hosting the virtualized network function for media handling, and the virtualized network function for media handling is managed by a virtualized network function manager. The method comprises to measure a delay or a variance of the delay of the media stream caused by the processing of the media stream by the virtualized network function for media handling, and to cause, as a result of the measurement step, a scaling of the virtualized network function for media handling.

According to another exemplary aspect of the invention, a method in a virtualized network function manager for preserving a media stream quality at processing of a media stream by a virtualized network function for media handling is provided. The virtualized network function for media handling is running in a network function virtualization infrastructure hosting the virtualized network function for media handling, and the virtualized network function for media handling is managed by the virtualized network function manager. The method comprises to scale the virtualized network function for media handling based on a determination of a media stream quality.

According to another exemplary aspect of the invention, a virtualized network function for media handling for preserving a media stream quality at processing of a media stream by the virtualized network function for media handling is provided. The virtualized network function for media handling is running in a network function virtualization infrastructure hosting the virtualized network function for media handling, and the virtualized network function for media handling is managed by a virtualized network function manager. The virtualized network function for media handling is capable of measuring a delay or a variance of the delay of the media stream caused by the processing of the media stream by the virtualized network function for media handling, and causing, as a result of the measurement step, a scaling of the virtualized network function for media handling.

According to another exemplary aspect of the invention, a virtualized network function manager for preserving a media stream quality at processing of a media stream by a virtualized network function for media handling is provided. The virtualized network function for media handling is running in a network function virtualization infrastructure hosting the virtualized network function for media handling, and the virtualized network function for media handling is managed by the virtualized network function manager. The virtualized network function manager is capable of scaling, based on a determination of media stream quality, the virtualized network function for media handling.

According to another exemplary aspect of the invention, a system for preserving a media stream quality at processing of a media stream by a virtualized network function for media handling is provided. The virtualized network function for media handling is running in a network function virtualization infrastructure hosting the virtualized network function for media handling, and the virtualized network function for media handling is managed by a virtualized network function manager. The system comprises the virtualized network function for media handling, the virtualized network function manager, and the network function virtualization infrastructure.

As to a still further aspect, a computer program product is provided. The computer program product comprises program code portions for performing the steps of any one of above aspects, e.g., when the computer program product is executed on one or more computing devices. The computer program product may be provided on a computer-readable recording medium and/or for download onto such a computer-readable recording medium in a data network, e.g., the communications network and/or the Internet.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

In the following, a system, method, node, virtualized network function, and computer program for preserving a media stream quality at processing of a media stream by a virtualized network function for media handling are described in more detail.

Within the context of the present application, the term "virtual network function (VNF)" may particularly denote a function taking on the responsibility of handling specific network functions that run on one or more virtual machines (VMs) on top of the hardware networking infrastructure—routers, switches, servers, hosting infrastructure, etc. Individual virtual network functions can be connected, combined, or chained together as building blocks to offer a full-scale networking communication or transport service.

Figure 2:
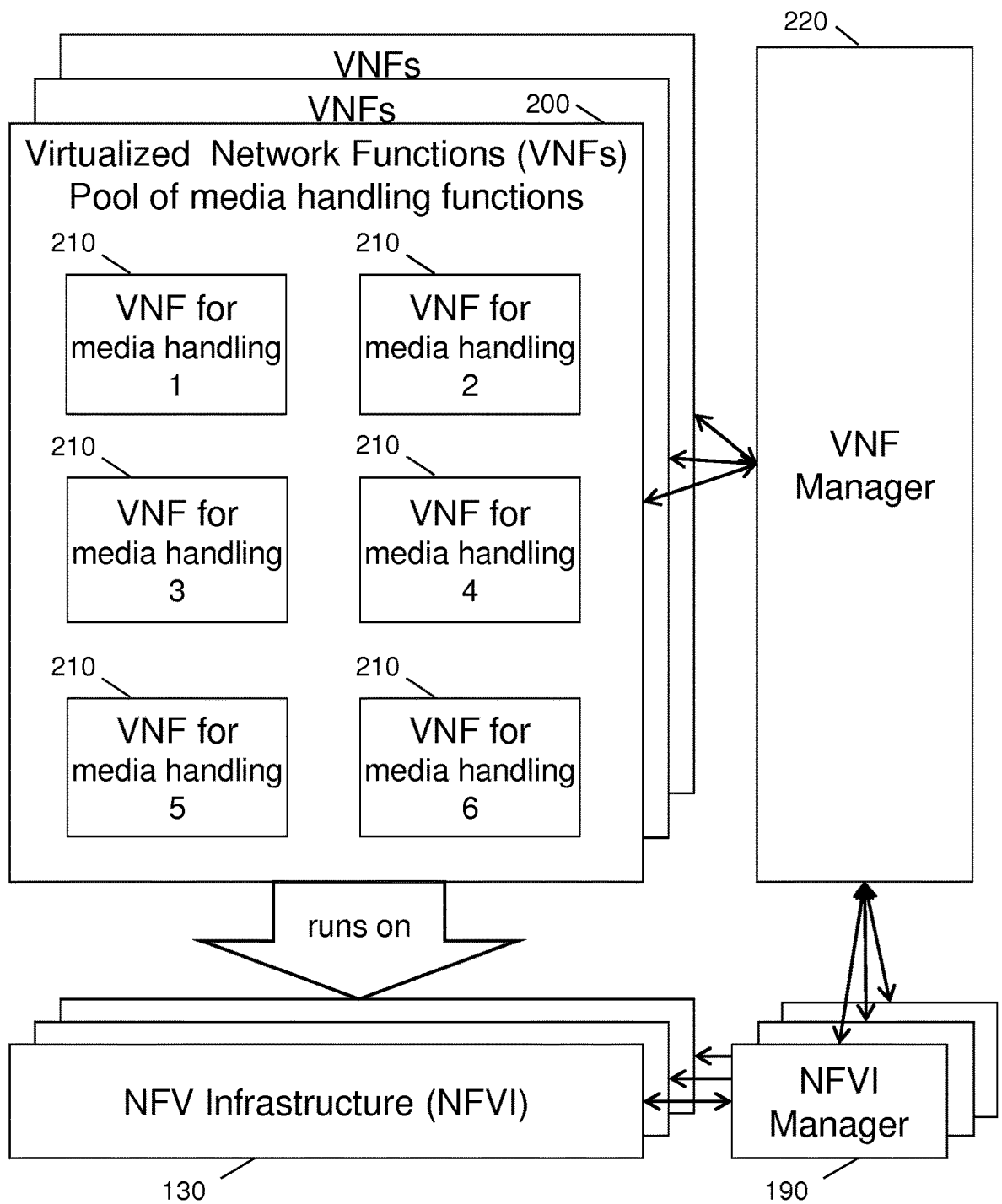
FIG. 2 shows an NFV architecture for VNF for media handling according to the invention.

Referring to FIG. 2, this figure shows a NFV architecture for VNF for media handling according to the invention.

The VNF for media handling 210 is performing the actual handling of the media stream. Media may be any type of conversational or streaming media, for example speech, audio, or video. The term "handling" refers to any kind of manipulation of the media as such, but also to formatting/framing actions to embed the media into a media related transport protocol. Such a media related transport protocol may be RTP (Real-Time Transport Protocol) or RTSP (Real-Time Streaming Protocol), being well known and widely used in the IP networks. It may also apply to the Message Session Relay Protocol (MSRP).

More concrete, the media handling function may be the function of a SBG (Session Border Gateway, consisting of a SBC, Session Border Controller and a MGW, Media Gateway) and handling may in this case comprise a firewalling function, voice/audio transcoding or video transcoding. The media handling function may also be the function of a MRFP (Media Resource Function Processor) and handling may in this case comprise any kind of transcoding, mixing, or manipulation of audio/speech or video streams. Furthermore, the media handling function may also be the function of a MGW and handling may in this case comprise speech stream transcoding, noise reduction, echo cancelling, volume adjustments and other manipulations of this kind. These media handling functions are used in IMS or softswitch communication networks.

There may be more than one VNF for media handling 210, and the VNF for media handling 210 may be grouped into pools 200 of media handling functions. Typically all media handling functions within the pool 200 would be functionally equal, so if there would be a need for a particular media handling function, any VNF for media handling 210 of the pool 200 could be chosen. FIG. 2 shows six VNF for media handling 210 within the pool 200, however, there may be more or also less VNFs for media handling 210 within the pool 200, depending on the capabilities of the NFVI 130 and the processing needs of the media handling function. There may be very demanding media handling functions such as video transcoding (comprising a decoding and encoding back-to-back), or also "light" tasks such as reframing, where the actual content of the media is not altered.

There may be several pools 200 of media handling functions, and each pool may serve a particular media handling function type. However, there may also be more than one pool of a particular media handling function type.

Figure 1:
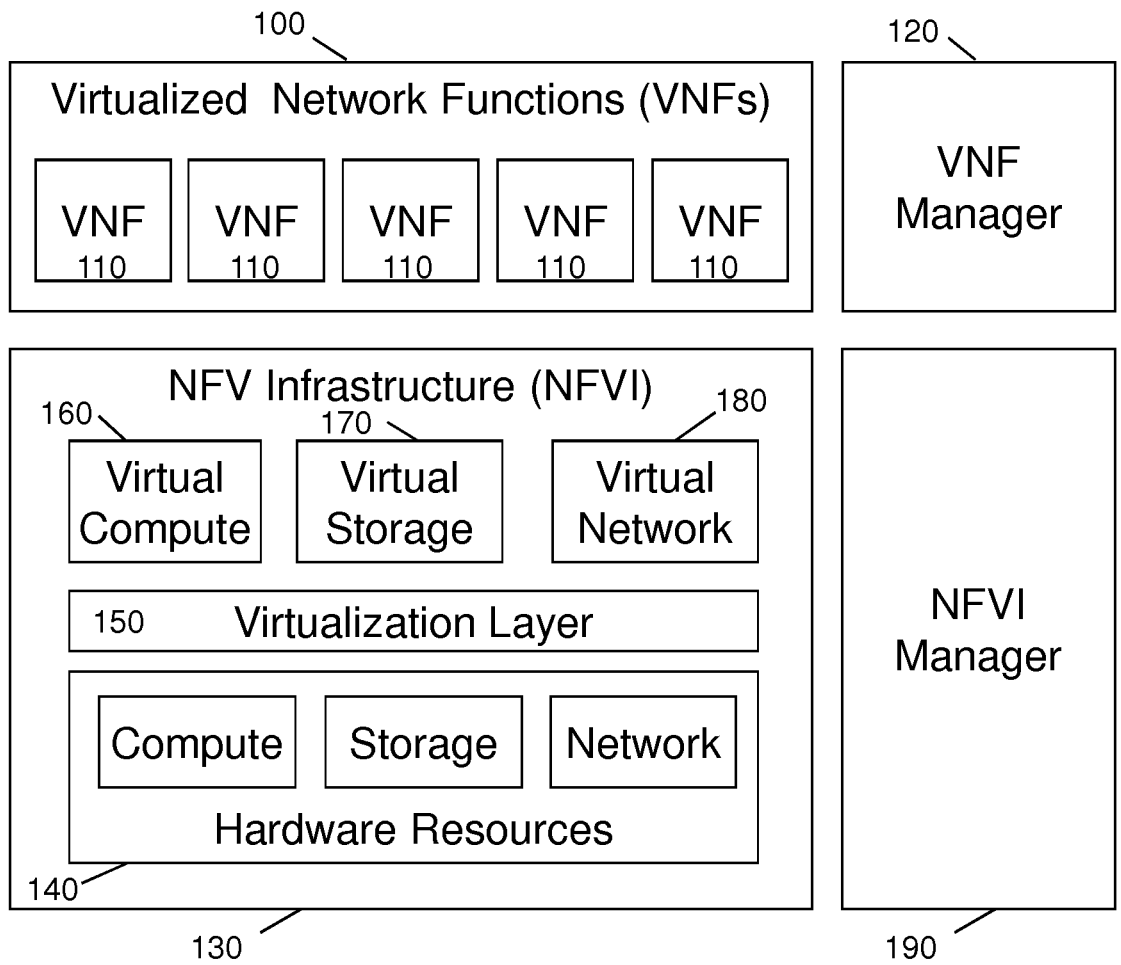
FIG. 1 shows an architectural framework for network function virtualization (NFV) according to prior art.

The VNF for media handling 210 are running on/are executed by a NFVI 130. There may be several instances of NFVI 130 hosting VNF for media handling 210. The NFVI 130 may host any type of VNF and the NFVI 130 may also host a mixture of different VNF. The NFVI 130 provides, as also shown in FIG. 1, the computing, storage, and network resources needed to run VNFs.

The NFVI 130 instances are managed by a NFVI manager 190. The NFVI manager 190 is in charge of allocating the available physical hardware resources to the virtual resources, which then are utilized by the VNF for execution of program code. This allocation may be dynamic in the sense that the NFVI manager 190 can increase or decrease the performance of VNF, e.g. by allocating more/less processing cores to a VNF or by allocating more/less memory to the VNF. So scaling of a VNF can be achieved, within the limits and granularity by the resources available at the NFVI 130, by increase or decrease the performance of VNF. The performance of a VNF may also be influenced by changing the priority of the VNF process in relation to all other VNF running on the same NFVI 130. There is a dedicated interface between the NFVI manager 190 and each of the NFVI 130 instances for performing this management.

The VNF manager 220 is acting as a coordinator between the VNF on one side and the NFVI 130 (via the NFVI manager 190) on the other side. The VNF manager 220 has control on what VNFs do exist, so it may instantiate new VNF instances of any kind, meaning more instances of existing VNF, or entirely new type of VNF. The VNF manager 220 may also shut down any of the existing instances of VNF. In case the VNFs are pooled, the VNF manager 220 may have dedicated interfaces to each of the pools 200 for performing this management task.

According to an exemplary aspect of the invention, a method for preserving a media stream quality at processing of a media stream by a VNF for media handling 210 is provided. The media stream quality may depend on a delay or a variance of the delay caused by the processing of the media stream by the VNF for media handling 210.

The VNF for media handling 210 is running in a NFVI 130 hosting the VNF for media handling 210, and the VNF for media handling 210 is managed by a VNF manager 220.

It is not possible for a VNF for media handling 210 to determine the objective or absolute media stream quality of a stream received by the VNF for media handling 210. Depending on a speech/audio/video codec used to encode the media stream at the source, there may already be an inherent level of absolute media stream quality. Furthermore, it is not possible for a VNF for media handling 210 to determine the delay (or variance of delay) that the media stream has already encountered on the path from the source up to the VNF for media handling 210. So for the scope of media stream quality, the VNF for media handling 210 has to define the media stream quality as received as the normalized reference. Any processing of the media stream will always add media stream quality impairment on top of this normalized reference, and it is this delta what the VNF for media handling 210 can determine and has an influence on. So the processing of the media stream by the VNF for media handling 210 results into a media stream quality, which is caused by the processing of the media stream by the VNF for media handling 210.

The provided method comprises to determine a media stream quality caused by the processing of the media stream by the VNF for media handling 210. As a result of the determining step, the VNF manager 220 scales the VNF for media handling 210.

The media stream may require real-time handling of the media stream, or the media stream may relate to a conversational communication service. Both require handling processing of media frames within a given, short time. Streaming of media implies that the stream is flowing from a server to a client, and thereby still allowing for few seconds of delay between sending of a media frame at the server and actual consumption of the stream at a client. In conversational communication services this delay requirement is much more stringent, here G.114 allows only less than 400 milliseconds delay.

The media stream may carry a user plane of a speech or video call and the media stream quality is a quality of the speech or video.

For the determination of the media stream quality there are different ways how to realize this. In a first alternative, the VNF for media handling 210 may determine the media stream quality and reports the determined media stream quality to the VNF manager 220.

This may be done by the VNF for media handling 210 by logging the reception time of a frame of the media stream at the VNF for media handling 210 and also logging the sending out of a corresponding processed frame of the processed media stream from the VNF for media handling 210. The difference between sending and receiving time stamp determines the processing delay caused by the processing of the media frame by the VNF for media handling 210. The delay variance may be determined by the VNF for media handling 210 by logging the determined delay over time and determine based on this the variance of the delay. By alternative, delay variance may be determined in relation to a given reference clock, e.g. used for synchronizing a constant pictures per second rate in case of video media, or given by a sampling rate for speech and audio media. Based on the determined delay or a variance of the delay the VNF for media handling 210 may calculate a corresponding media stream quality and report this resulting media stream quality to the VNF manager 220.

In a second alternative, the VNF manager 220 may determine the media stream quality. In this case the VNF manager 220 may determine the media stream quality based on measurements reported from the VNF for media handling 210. In this case the VNF for media handling 210 does the measurement and determination of the delay or a variance of the delay and reports these to the VNF manager 220, who does the calculation of the corresponding media stream quality. The VNF for media handling 210 may also report just the measured delay value and the VNF manager 220 determines the variance of the delay. The VNF for media handling 210 may also collect a number of measurements and reports to the VNF manager 220 only at certain time intervals or when a certain amount of measurement information has been collected. In yet another alternative the VNF for media handling 210 logs if a threshold has been met. The VNF for media handling 210 then checks the log history and reports to the VNF manager 220 only if the threshold has been met for several measurements in a row. This may avoid that actions are triggered unnecessarily and only if the media stream quality issue persists.

In yet another alternative, the VNF manager 220 may determine the media stream quality based on measurements reported from a test media stream generator. The test media stream generator may generate a reference media stream, route this reference media stream via a VNF for media handling 210 under test, and after being processed, route the processed media stream back to the test media stream generator. By comparing the processed media stream with a predetermined, expected result, the test media stream generator can verify whether the processing has been applied correctly. The test media stream generator may determine a delay or a variance of the delay caused by the processing of the media stream by the VNF for media handling 210. This may be done by logging the sending time of a frame of a test media stream and also logging the reception of a corresponding processed frame of the processed media stream. The difference between sending and receiving time stamp determines the processing delay. Additional delay caused by the transmission from the test media stream generator to the VNF for media handling 210 under test and back may be considered (or neglected as insignificant) in the calculation. The delay variance may be determined by logging the determined delay over time and determine based on this the variance of the delay. The test media stream generator may then report the result to the VNF manager 220. Also in this scenario, the test media stream generator may determine the media stream quality or just report the measurements and the VNF manager 220 determines the media stream quality, in a similar way as described above.

The test media stream generator may determine the media stream quality on instruction from the VNF manager 220. So there is no permanent monitoring of the media stream quality, but for example at peak traffic hour only. Furthermore, the test media stream generator may be running as a separate VNF in the same NFVI 130 or any other NFVI under the control of the VNF manager 220, provided that the test media stream generator can reach the VNF for media handling 210 under test. The VNF manager 220 may instantiate the VNF test media stream generator only when a media stream quality determination is needed (e.g. at that peak traffic hour).

As a result of the determining step of determining the media stream quality, the VNF manager 220 scales the VNF for media handling 210. Scaling may comprise different steps. Scaling of the VNF for media handling 210 may be scaling-in or scaling-out of the VNF for media handling 210. Here scaling-out comprises increasing a performance of the VNF for media handling 210, and scaling-in comprises decreasing a performance of the VNF for media handling 210.

Changing the performance the VNF for media handling 210 may comprise different alternatives. The performance of the VNF for media handling 210 may be scaled by changing at least one of, a number of virtual processors allocated to the VNF for media handling 210, and an amount of virtual memory allocated to the VNF for media handling 210. By alternative, the performance of the VNF for media handling 210 may be scaled by altering the priority of the VNF for media handling 210 in relation to other VNF hosted by the NFVI 130.

In an further alternative, the performance of the VNF for media handling 210 may be scaled by moving the VNF for media handling 210 to a further NFVI, e.g. a NFVI having spare capacity. By yet another alternative, scaling-out may also comprise instantiating a further VNF for media handling 210.

Scaling-in may comprise shutting down at least one of the existing VNF for media handling 210. Instantiating a further VNF for media handling 210, or shutting down one of the existing VNF for media handling 210 may be done only if the performance of the VNF for media handling 210 cannot be scaled further.

Scaling-out is triggered if media stream quality exceeds a predetermined first threshold and scaling-in is triggered if media stream quality is below a predetermined second threshold. These thresholds may be set by the network operator as configuration data in the VNF manager 220, or in each VNF for media handling 210, depending on the scenario.

In this case the media stream quality would indicate a bad quality by higher values of the media stream quality. Correspondingly, a good speech quality would be indicated by lower values of the media stream quality. The thresholds for scaling-in and scaling-out are set accordingly. By alternative, good media stream quality may be indicated by higher values. In this case the thresholds for scaling-in and scaling-out must be swapped accordingly.

Figure 3:
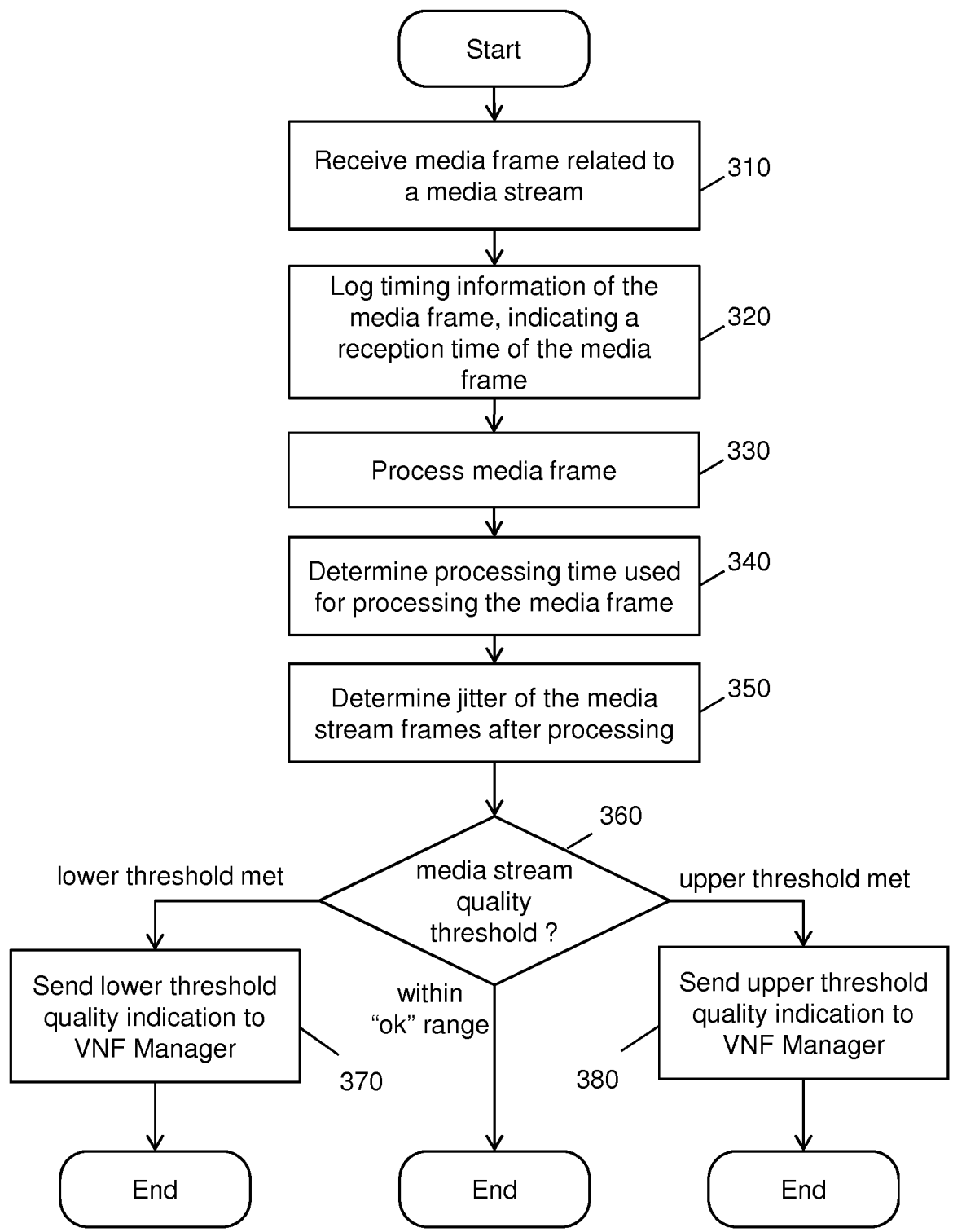
FIG. 3 shows a block flow of a VNF for media handling according to the invention.

Referring to FIG. 3, this figure shows a block flow of a VNF for media handling. The VNF for media handling may be a VNF for media handling 210 as of FIG. 2.

This flow exemplifies the scenario where the media stream quality is determined by the VNF for media handling and a report is provided to the VNF manager 220 when a media stream quality threshold is met.

The flow starts in step 310 when the VNF for media handling receives a frame related to a media stream. A frame in general refers to the smallest independent data block unit of a protocol used to transport the media as a stream. The media stream may require real-time handling of the media stream, or the media stream may relate to a conversational communication service. The media stream may carry a user plane of a speech or video call and the media stream quality is a quality of the speech or video.

In step 320 the VNF for media handling logs timing information of the media frame, indicating a reception time of the media frame. This timing information may be logged in a storage within the VNF for media handling, or may also be appended as additional information to the media frame or to the media stream and may be carried through the media processing as part of the media frame. In this case the additional information must be removed before the frame is sent out.

In step 330 the VNF for media handling processes the media frame. Depending on the function, this may comprise various actions. It may be the function of a SBG and processing may in this case comprise a firewalling function, voice/audio transcoding or video transcoding. The processing may also be the function of a MRFP and handling may in this case comprise any kind of transcoding, mixing, or manipulation of audio/speech or video streams. Furthermore, the processing may also be the function of a MGW and may in this case comprise speech stream transcoding, noise reduction, echo cancelling, volume adjustments and other manipulations of this kind.

In step 340 the VNF for media handling determines the processing time used for processing the media frame. This can be done by taking another time stamp at the very last step of the processing of the media frame, or by taking the second time stamp when sending out the processed media frame. The processing time would be equated to the difference between the two time stamps, taken at reception of the media frame in step 310, and taken after finalizing the procession of the same media frame.

In step 350 the VNF for media handling determines the delay variance of the media stream frame after processing. This may be done by maintaining a history log of previous delays and determine it variance. Delay variance may also be determined in relation to a given reference clock, e.g. used for synchronizing a constant pictures per second rate in case of video media, or given by a sampling rate for speech and audio media. The media stream quality is then calculated based on the delay measurement or determined delay variance.

In step 360 the VNF for media handling determines whether the media stream quality has reached a threshold. Possible results of the determination step 360 can be that a lower media stream quality threshold has been met (or is below), an upper media stream quality threshold has been met (or is above), or that the determined media stream quality is in-between the upper and lower threshold.

If the determined media stream quality is in-between the upper and lower threshold, so is in the "ok" range, no further steps are performed and the flow ends.

If the determined media stream quality has met or is below a lower threshold, step 370 is executed. The VNF for media handling reports to a VNF Manager, which may be the VNF manager 220. The reporting may comprise an indication that the lower threshold has been met or is undercut, or by alternative, the VNF for media handling reports the calculated value of the determined media stream quality. Then the flow ends.

If the determined media stream quality has met or is above an upper threshold, step 380 is executed. The VNF for media handling reports to the VNF Manager, which may be the VNF manager 220. The reporting may comprise an indication that the upper threshold has been met or is exceeded, or by alternative, the VNF for media handling reports the calculated value of the determined media stream quality. Then the flow ends.

The procedure in the VNF manager 220 ensures that the VNF manager 220 is made aware when a media stream quality threshold (upper or lower) is met.

Figure 4:
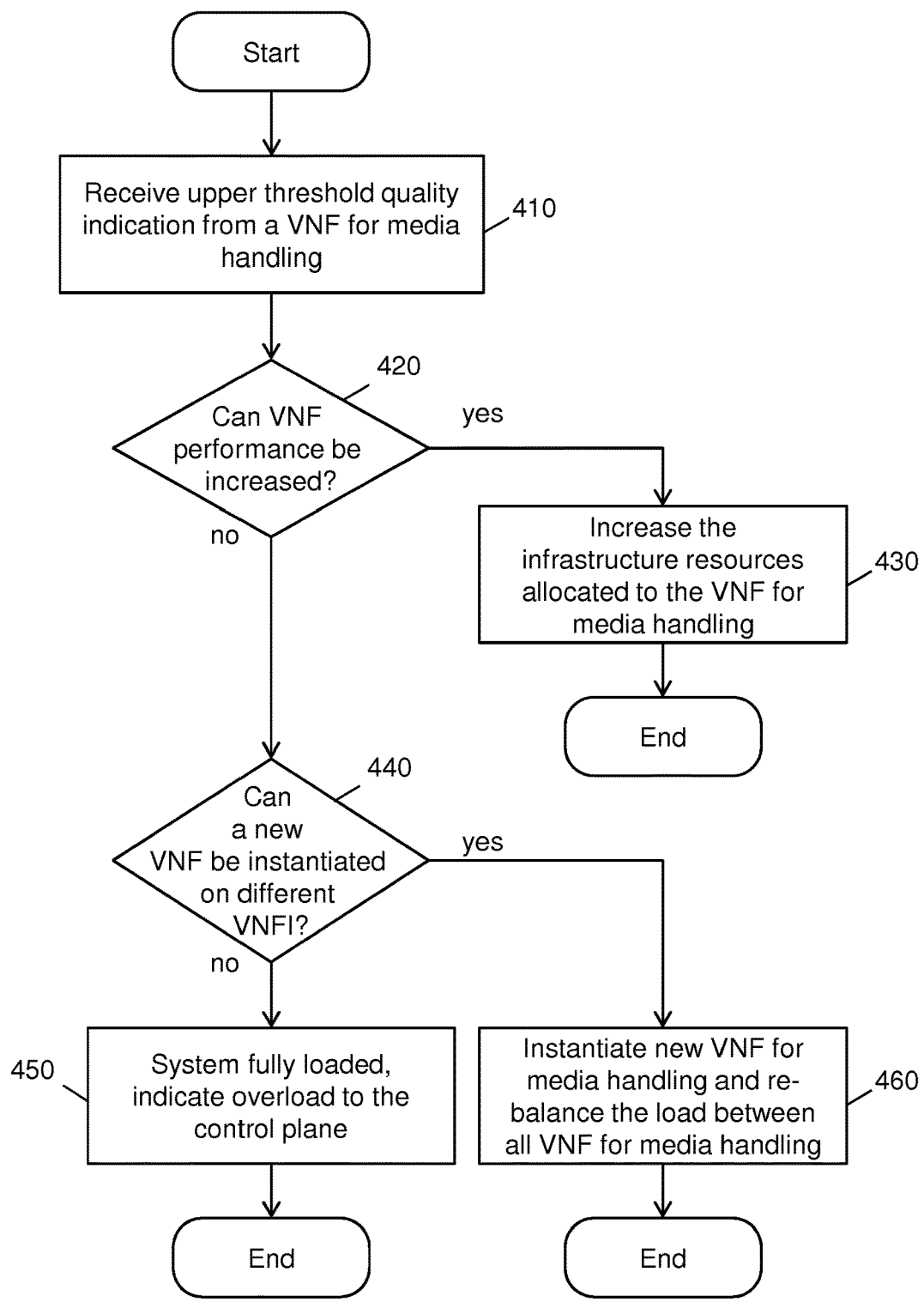
FIG. 4 shows a block flow of a VNF manager for a scaling-out operation according to the invention.

Referring to FIG. 4, this figure shows a block flow of a VNF manager for a scaling-out operation. The VNF manager may be the VNF manager 220 of FIG. 2.

The flow starts in step 410 when the VNF manager receives a report from a VNF for media handling indicating that an upper media stream quality threshold has been met or exceeded. In this scenario higher levels of media stream quality indicate a worse media stream quality. To meet or exceed an upper media stream quality threshold means that the media stream quality threshold has become so bad that actions shall be triggered to preserve the media stream quality. The report from the VNF for media handling may comprise an indication that the upper threshold has been met or is exceeded, or by alternative, the VNF for media handling reports the calculated value of the determined media stream quality.

In step 420 the VNF manager checks whether the performance of the VNF for media handling can be increased. The performance of a VNF may be increased by changing the number of virtual processors allocated to the VNF or an amount of virtual memory allocated to the VNF. By alternative, the performance of the VNF may be increased by altering the priority of the VNF in relation to other VNF hosted by the same NFVI. In an even further alternative, the performance of the VNF may be scaled by moving the VNF to a further NFVI.

If it is still possible to increase the performance of the VNF for media handling, so the answer to the check in step 420 is yes, step 430 is performed and the VNF for media handling is scaled by allocating more resources to the VNF for media handling, or move it to a NFVI with more/free resources. The VNF manager may keep track on the infrastructure resources allocated to each VNF for media handling, or may fetch this information from the NFVI manager. Here the VNF manager, together with the NFVI manager, determines whether it is meaningful to allocate more infrastructure resources to the VNF for media handling. Some media processing functions may not scale well with the allocated infrastructure resources, so in this case this would not be useful and the check in step 420 would result into a "no".

After step 430 the flow ends. Here it is assumed that the VNF for media handling may continue to report bad media stream quality to the VNF manager, if the newly allocated resources are not sufficient to solve the media stream quality issue, and in this case the flow is re-entered at step 410.

If the performance of the VNF for media handling cannot be increased further, so the answer to the check in step 420 is no, the VNF manager may trigger other measures to counteract the bad media stream quality. In step 440 the VNF manager checks whether a new VNF for media handling instance can be instantiated, maybe on a different NFVI with spare capacity. If that is possible and meaningful, so the answer to the check in step 440 is yes, step 460 is executed and the VNF manager instantiates a new VNF for media handling on that NFVI and re-balances the load between all VNF for media handling. Instantiating a new VNF for media handling instance on a different NFVI with spare capacity may enable more media stream processing capabilities for the network. However, instantiating a new VNF for media handling instance on the same NFVI may make also sense, if there is a limit in the allocated infrastructure resources per VNF for media handling and that limit has been reached.

After step 460 the flow ends. When the VNF for media handling is e.g. moved to another NFVI with free capacity, the media stream quality will improve. This may trigger the flow of FIG. 5, where resources of this VNF for media handling may be withdrawn.

If no new VNF for media handling instance can be instantiated, so the answer to the check in step 440 is no, this means that the media stream handling system is fully loaded and new traffic shall be rejected. This can be done in step 450 by informing the control plane nodes (such as MSC, SBC, or MRFC), using existing methods such as H.248.11, Media gateway overload control package. Then the flow ends.

Figure 5:
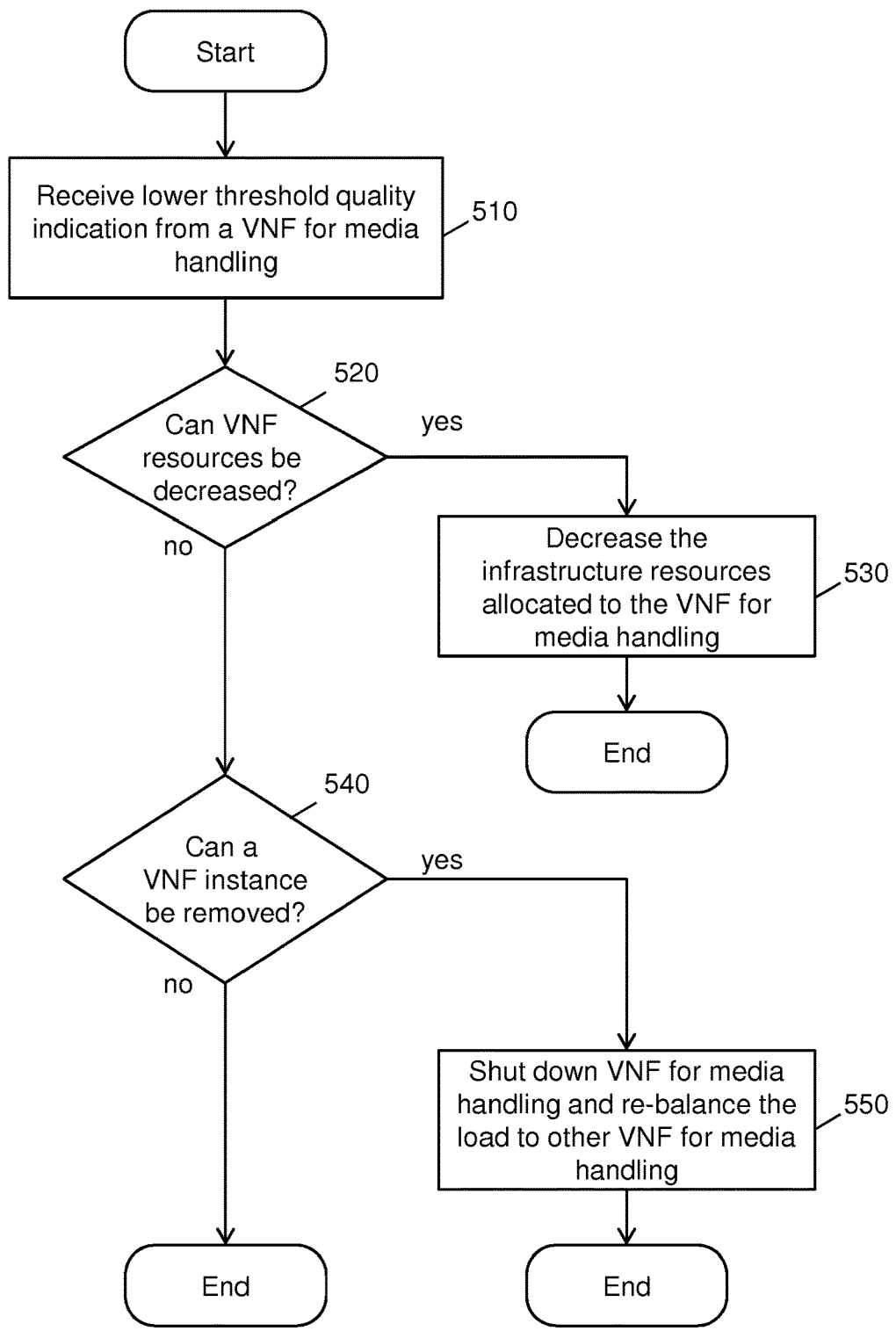
FIG. 5 shows a block flow of a VNF manager for a scaling-in operation according to the invention.

Referring to FIG. 5, this figure shows a block flow of a VNF manager for a scaling-in operation. The VNF manager may be the VNF manager 220 of FIG. 2.

The flow starts in step 510 when the VNF manager receives a report from a VNF for media handling indicating that a lower media stream quality threshold has been met or undercut. In this scenario lower levels of media stream quality indicate a better media stream quality. To meet or undercut a lower media stream quality threshold means that the media stream quality threshold has become so good that actions can be triggered to free up allocated resources. The report from the VNF for media handling may comprise an indication that the lower threshold has been met or is undercut, or by alternative, the VNF for media handling reports the calculated value of the determined media stream quality.

In step 520 the VNF manager checks whether the performance of the VNF for media handling can be decreased. The performance of a VNF can be decreased by changing the number of virtual processors allocated to the VNF or an amount of virtual memory allocated to the VNF. By alternative, the performance of the VNF may be decreased by altering the priority of the VNF in relation to other VNF hosted by the same NFVI. In an even further alternative, the performance of the VNF may be scaled by concentrating more VNFs on the same NFVI.

If there is still room to decrease the performance of the VNF for media handling, so the answer to the check in step 520 is yes, step 530 is performed and the VNF for media handling is scaled by decreasing resources allocated to the VNF for media handling, or to concentrate VNFs on the same NFVI to free resources. Then the flow ends. Here it is assumed that the VNF for media handling may continue to report good media stream quality to the VNF manager, if it is possible to remove further allocated resources, so in this case the flow is re-entered at step 510. However, due to the task of processing a media stream frame, a minimum delay may naturally not be possible to avoid.

If the performance of the VNF for media handling cannot be decreased further, so the answer to the check in step 520 is no, the VNF manager may trigger other measures to free up further resources of the NFVI. In step 540 the VNF manager checks whether a VNF for media handling instance can be removed. If that is possible, so the answer to the check in step 540 is yes, the VNF manager triggers shutting down of a VNF for media handling and re-balances the load of that VNF for media handling between all remaining VNF for media handling. Then the flow ends. When a VNF for media handling is removed, the media stream quality may become worse, as the same traffic is handled by less VNF for media handling instances. This may trigger the flow of FIG. 4, where resources of the VNF for media handling may be increased.

In order to avoid cyclic scaling-in and scaling-out operations, the thresholds can be selected in a way that a hysteresis is applied. By alternative, consecutive scaling-in and scaling-out operations may be limited by a timer blocking the next operation for a certain time period.

If no new VNF for media handling instance can be removed, so the answer to the check in step 540 is no, the flow ends. In this case the system would be idling at a low load.

Figure 6:
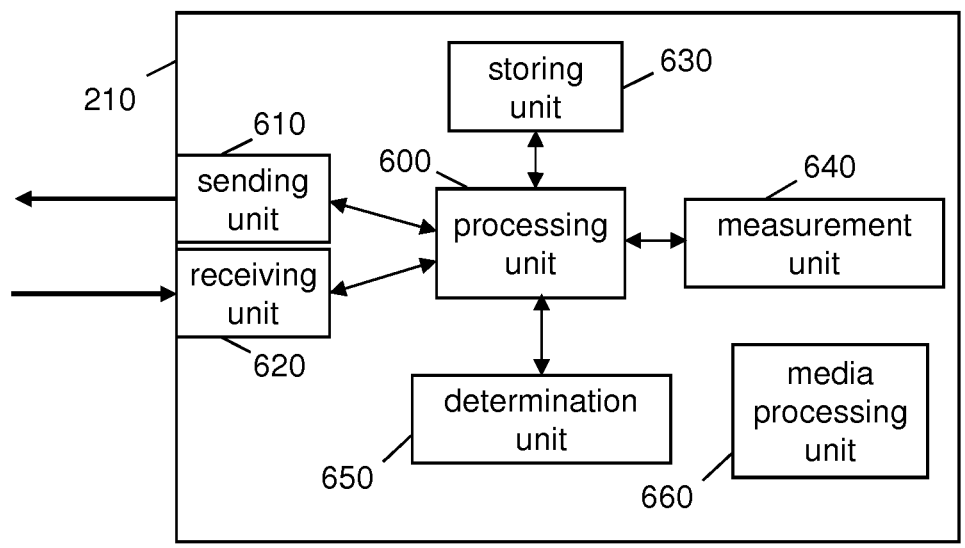
FIG. 6 shows a diagram illustrating a VNF for media handling according to the invention.

Referring to FIG. 6, this figure shows a block diagram illustrating a VNF for media handling according to an embodiment. The VNF for media handling may be the VNF for media handling 210 of FIG. 2 and may perform any steps of the method of FIG. 3. The VNF for media handling may be a pure software instance running on a NFVI.

The VNF for media handling 210 may comprise a number of functional units, which are described in further detail below and which are adapted to perform respective method steps.

A processing unit 600 of the VNF for media handling 210 may be adapted to execute steps for preserving a media stream quality at processing of a media stream by a VNF for media handling. The processing unit 600 coordinates the communication between the different functional units. The processing unit 600 may forward media streams between receiving unit 620, the media processing unit, and the sending unit 620. This forwarding task may also be performed by a separate, specialized forwarding unit. The processing unit 600 may initiate measuring a delay or a variance of the delay of the media stream caused by the processing of the media stream by the virtualized network function for media handling. The processing unit 600 may cause, as a result of the measurement step, a scaling of the virtualized network function for media handling.

The VNF for media handling 210 may further comprise a sending unit 610 and a receiving unit 620 via which the VNF for media handling 210 can communicate with other physical entities or VNFs such as the VNF manager or other instances of VNF for media handling for chained media stream processing. The sending unit 610 may send out signaling messages composed by the processing unit 600. The receiving unit 620 may receive signaling messages from those entities above and forward the received signaling messages to the processing unit 600 for decoding and/or dispatching. The receiving unit 620 may also receive the media stream to be processed, and the sending unit 610 may also send out the processed media stream. The sending/receiving of the media stream may also be done by separate, dedicated sending/receiving units specific/optimized for media streams.

The VNF for media handling 210 may also comprise a storing unit 630 for storing information related to preserving a media stream quality at processing of a media stream by a VNF for media handling. The storing unit 630 may keep a history of measurements in order to determine the delay variance of the media stream. The storing unit 630 may be a pure software functional module such as a SQL database software module. The storing unit 630 may also have access to and/or use a centralized storage (e.g. a Network Attached Storage, NAS) comprising various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 630 may be used by the processing unit 600 to store information, for example program code or data related to VNF for media handling 210 tasks.

The VNF for media handling 210 may further comprise a measurement unit 640 adapted to measure the delay caused by the media stream processing. This may be achieved by generating an incoming and outgoing time stamp per media frame and calculate the time difference. This task may also be performed together with the sending/receiving units, which may also generate incoming and outgoing time stamps.

The VNF for media handling 210 may further comprise a determination unit 650. In the scenario where the VNF for media handling 210 reports when an upper or lower threshold is met, this determination unit 650 may be utilized to determine the media stream quality based on the measurements provided by the measurement unit 640. After determination of the media stream quality, the determination unit 650 may determine whether an upper or lower threshold has been met, and if so triggering the sending of a report to the VNF manager.

The VNF for media handling 210 may also comprise a media processing unit 660 performing the actual processing of the media stream. Depending on the task of the VNF for media handling 210, this processing may be an audio/speech/video transcoding, mixing, volume adjustment, noise reduction task or there like. The media processing unit 660 may also support the measurement unit 640 in measuring the processing delay.

Figure 7:
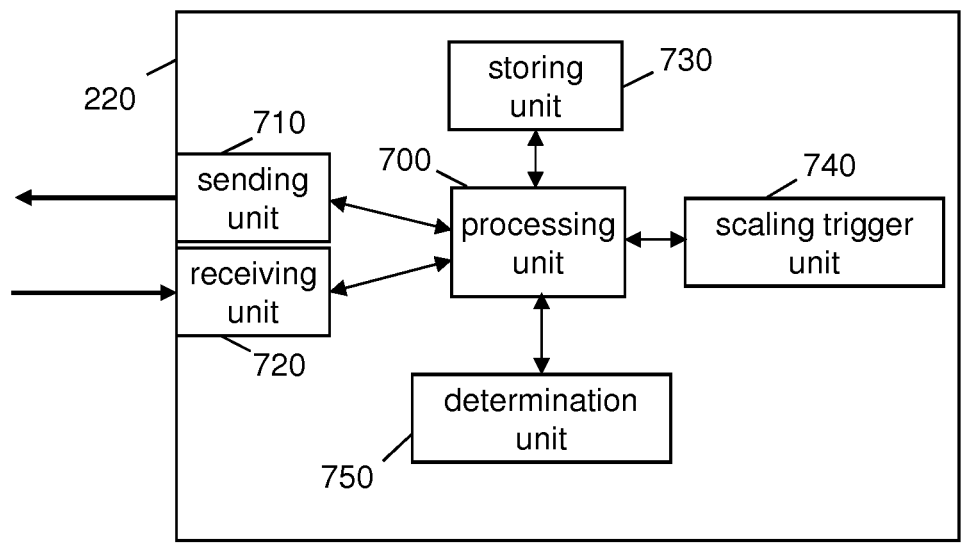
FIG. 7 shows a diagram illustrating a VNF manager according to the invention.

Referring to FIG. 7, this figure shows a block diagram illustrating a VNF manager according to an embodiment. The VNF manager may be the VNF manager 220 of FIG. 2 and may perform any of the steps of the method of FIG. 4 or FIG. 5.

The VNF manager 220 may comprise a number of functional units, which are described in further detail below and which are adapted to perform respective method steps.

A processing unit 700 of the VNF manager 220 may be adapted to execute steps for preserving a media stream quality at processing of a media stream by a VNF for media handling. In a practical implementation the processing unit 700 may be one processor taking care of all the above functions, or may also be distributed over more than one processor, wherein the functions are distributed over the available processors. The VNF manager 220 may be a VNF itself, e.g. instantiated by a master VNF manager running on the same or a further NFVI.

The VNF manager 220 may further comprise a sending unit 710 and a receiving unit 720 via which the VNF manager 220 can communicate with other entities such as the NFVI manager or instances of VNF for media handling. The sending unit 710 may send out signaling messages composed by the processing unit 700. The receiving unit 720 may receive signaling messages from those entities above and forward the received signaling messages to the processing unit 700 for handling. The VNF manager 220 may comprise more than one sending unit and receiving unit for signaling capacity and redundancy reasons.

The VNF manager 220 may also comprise a storing unit 730 for storing information related to preserving a media stream quality at processing of a media stream by a VNF for media handling. So the VNF manager 220 may keep track on which instances of VNF for media handling exist and whether media stream quality issues have been reported from them recently. The storing unit 730 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 730 may be used by the processing unit 700 to store information, for example program code or data related to VNF manager 220 tasks.

The VNF manager 220 may also comprise a scaling trigger unit 740 adapted to perform scaling of VNF for media handling, as described in FIG. 4 and FIG. 5.

The VNF manager 220 may further comprise a determination unit 750. In the scenario where the VNF for media handling just reports measurements, this determination unit 750 may be utilized to determine the media stream quality based on the measurements received from the VNF for media handling. After determination of the media stream quality, the determination unit 750 may also determine whether an upper or lower threshold has been met, and if so triggering the scaling trigger unit 740 to perform the actual scaling-in or scaling-out operation.

According to another embodiment, a computer program is provided. The computer program may be executed by the processing units 500 and/or 600 of the above mentioned entities 100 and/or 110 respectively such that a method for handling of re-selection of a RAN by a UE as described above with reference to FIG. 3 or 4 may be carried out or be controlled. In particular, the entities 100 and/or 110 may be caused to operate in accordance with the above described method by executing the computer program.

The computer program may be embodied as computer code, for example of a computer program product. The computer program product may be stored on a computer readable medium, for example a disk or the storing unit 506 and/or 606 of the entities 100 and/or 110, or may be configured as downloadable information.

One or more embodiments as described above may enable at least one of the following technical effects:
- higher utilization of VNF for media handling since the media stream quality is supervised, the utilization can be increased without loss of media stream quality
- free up resources that are not utilized since the media stream quality is supervised, resources are freed-up until media stream quality is impacted automatic procedure without need for manual intervention media handling nodes can be moved away from specialized hardware into the cloud, while maintaining acceptable media stream quality Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for preserving a media stream quality at processing of a media stream by a virtualized network function for media handling, wherein the virtualized network function for media handling is running in a network function virtualization infrastructure hosting the virtualized network function for media handling, the virtualized network function for media handling being managed by a virtualized network function manager, the method comprising:

determining a media stream quality caused by the processing of the media stream by the virtualized network function for media handling, wherein the media stream quality comprises a quality measure of the media stream output by the virtualized network function; and scaling, by the virtualized network function manager as a result of the determining step, the virtualized network function for media handling to increase or decrease a performance of the virtualized network function for media handling by changing a priority of the virtualized network function for media handling in relation to other virtualized network functions hosted by the network function virtualization infrastructure.

2. The method of claim 1, wherein the media stream quality is a delay variance of the media stream caused by the processing of the media stream by the virtualized network function for media handling.

3. The method of claim 1, wherein the virtualized network function for media handling determines the media stream quality and reports the media stream quality to the virtualized network function manager.

4. The method of claim 1, wherein the virtualized network function manager determines the media stream quality.

5. A method, in a virtualized network function manager, for preserving a media stream quality at processing of a media stream by a virtualized network function for media handling, wherein the virtualized network function for media handling is running in a network function virtualization infrastructure hosting the virtualized network function for media handling, the virtualized network function for media handling being managed by the virtualized network function manager, the method comprising:

determining a media stream quality, wherein the media stream quality comprises a quality measure of the media stream output by the virtualized network function;

scaling, based on the media stream quality, the virtualized network function for media handling to increase or decrease a performance of the virtualized network function for media handling by changing a priority of the virtualized network function for media handling in relation to other virtualized network functions hosted by the network function virtualization infrastructure.

6. The method of claim 5, wherein determining the media steam quality comprises receiving a media stream quality indication from a virtualized network function for media handling.

7. The method of claim 5, wherein determining the media steam quality comprises:

receiving a measurement of a delay variance of the media stream caused by the processing of the media stream by the virtualized network function for media handling; and determining a media stream quality based on the received measurements.

8. A virtualized network function for media handling for preserving a media stream quality at processing of a media stream by the virtualized network function for media handling, wherein the virtualized network function for media handling is running in a network function virtualization infrastructure hosting the virtualized network function for media handling, the virtualized network function for media handling being managed by a virtualized network function manager, the virtualized network function for media handling comprising:

processing circuitry;

memory containing instructions executable by the processing circuitry whereby the virtualized network function for media handling is operative to:

measure a delay or a variance of the delay of the media stream caused by the processing of the media stream by the virtualized network function for media handling, wherein the media stream quality comprises a quality measure of the media stream output by the virtualized network function; and cause, as a result of the measuring, a scaling of the virtualized network function for media handling to increase or decrease a performance of the virtualized network function for media handling by changing a priority of the virtualized network function for media handling in relation to other virtualized network functions hosted by the network function virtualization infrastructure.

9. A virtualized network function manager for preserving a media stream quality at processing of a media stream by a virtualized network function for media handling, wherein the virtualized network function for media handling is running in a network function virtualization infrastructure hosting the virtualized network function for media handling, the virtualized network function for media handling being managed by the virtualized network function manager, the virtualized network function manager comprising:

processing circuitry;

memory containing instructions executable by the processing circuitry whereby the virtualized network function manager is operative to:

scale, based on a determination of media stream quality, the virtualized network function for media handling, wherein the media stream quality comprises a quality measure of the media stream output by the virtualized network function, to increase or decrease a performance of the virtualized network function for media handling by changing a priority of the virtualized network function for media handling in relation to other virtualized network functions hosted by the network function virtualization infrastructure.

10. The method of claim 1 wherein the media stream quality is determined based on comparison of the media stream quality output by the virtualized network function to a normalized reference, wherein the normalized reference is a media stream quality of the media stream as received the virtualized network function.

11. The method of claim 5 wherein the media stream quality is determined based on comparison of the media stream quality output by the virtualized network function to a normalized reference, wherein the normalized reference is a media stream quality of the media stream as received the virtualized network function.

12. The method of claim 1, wherein:
scaling is one of a scaling-in and a scaling-out of the virtualized network function for media handling;
the scaling-out is triggered if media stream quality exceeds a predetermined first threshold; and
the scaling-in is triggered if media stream quality is below a predetermined second threshold.

13. The method of claim 5, wherein:
scaling is one of a scaling-in and a scaling-out of the virtualized network function for media handling;
the scaling-out is triggered if media stream quality exceeds a predetermined first threshold; and
the scaling-in is triggered if media stream quality is below a predetermined second threshold.

* * * * *